(12) United States Patent
Sako et al.

(10) Patent No.: US 7,099,545 B2
(45) Date of Patent: Aug. 29, 2006

(54) SINGLE-MODE OPTICAL FIBER

(75) Inventors: Akifumi Sako, Tokyo (JP); Ryuichi Sugizaki, Tokyo (JP); Takeshi Yagi, Tokyo (JP)

(73) Assignee: The Furukawa Electric Co., Ltd., Tokyo (JP)

(*) Notice: Subject to any disclaimer, the term of this patent is extended or adjusted under 35 U.S.C. 154(b) by 62 days.

(21) Appl. No.: 11/022,752

(22) Filed: Dec. 28, 2004

(65) Prior Publication Data

US 2006/0093297 A1    May 4, 2006

(30) Foreign Application Priority Data

Oct. 28, 2004  (JP) .............................. 2004-313625

(51) Int. Cl.
*G02B 6/02* (2006.01)
*G02B 6/00* (2006.01)
*G01N 21/00* (2006.01)
*G01J 1/04* (2006.01)

(52) U.S. Cl. ...................... 385/123; 385/126; 385/127; 385/141; 385/142; 356/73.1; 250/227.16

(58) Field of Classification Search ........ 385/123–127, 385/141, 142; 356/73.1; 250/227.16
See application file for complete search history.

(56) References Cited

U.S. PATENT DOCUMENTS 6,477,297 B1* 11/2002 DeMeritt et al. ............. 385/32
6,711,330 B1* 3/2004 Donlagic ..................... 385/123
7,035,514 B1* 4/2006 Oyamada .................... 385/123
2005/0058418 A1* 3/2005 Prasad et al. ............... 385/127

OTHER PUBLICATIONS

Masataka Ikeda, et al., "Low Bending Loss Optical Fiber with Reduced Splice Loss", Technical Report of IEICE, Aug. 2003, pp. 35-40, (with English Abstract and Additional partial English translation).
U.S. Appl. No. 11/022,752, filed Dec. 28, 2004, Sako et al.
U.S. Appl. No. 11/271,823, filed Nov. 14, 2005, Sako et al.
Hiroshi Kutami, et al., "Low-Bending-Loss and Suppressed-Splice-Loss Optical Fibers for FTTH Indoor Wiring", Ninth Optoelectronics and Communications Conference/Third International Conference on Optical Internet (OECC/COIN2004) Technical Digest, Jul. 2004, pp. 74-75.

* cited by examiner

*Primary Examiner*—Brian Healy
*Assistant Examiner*—Charlie Peng
(74) *Attorney, Agent, or Firm*—Oblon, Spivak, McClelland, Maier & Neustadt, P.C.

(57) ABSTRACT

Provided is a single-mode optical fiber that propagates an optical signal at a wavelength of 1310 nm, in single-mode operation; has a mode field diameter of 6.6 μm or more at the wavelength of 1310 nm; and a macro bending loss of at most 0.1 dB/10 turns with a bending radius of 7.5 mm at a wavelength of 1650 nm.

7 Claims, 9 Drawing Sheets

MFD and variance are values with 1310 nm. MACRO Bending loss is value with 1650 nm, a bending radius of r=7.5 mm, and 10 turns.

| | Δ1 | α1 | Δ2 | a/μm | b/μm | MFD/μm | MACRO BEND LOSS/dB | VARIANCE / ps/ nm·km | λc /nm | λcc /nm |
|---|---|---|---|---|---|---|---|---|---|---|
| A | 0.60 | 2.0 | -0.4 | 10.2 | 17.0 | 6.88 | 0.08 | 1.26 | 1271 | 1253 |
| A1 | 0.50 | 4.0 | -0.4 | 10.1 | 16.8 | 6.95 | 0.21 | 2.84 | 1280 | 1257 |
| A2 | 0.55 | 4.0 | -0.4 | 9.5 | 15.9 | 6.60 | 0.07 | 2.50 | 1277 | 1250 |
| A3 | 0.55 | 4.5 | -0.4 | 9.4 | 15.6 | 6.55 | 0.06 | 2.58 | 1278 | 1250 |
| A4 | 0.70 | 1.0 | -0.4 | 12.2 | 20.3 | 7.14 | 0.17 | -0.71 | 1282 | 1258 |
| A5 | 0.70 | 1.5 | -0.4 | 10.6 | 17.7 | 6.63 | 0.03 | -0.06 | 1281 | 1256 |
| A6 | 0.75 | 1.5 | -0.4 | 10.2 | 17.0 | 6.39 | 0.01 | -0.47 | 1277 | 1255 |
| A7 | 0.55 | 2.5 | -0.1 | 9.8 | 16.3 | 7.00 | 0.13 | -0.81 | 1281 | 1248 |
| A8 | 0.55 | 2.5 | -0.2 | 10.1 | 16.9 | 6.95 | 0.09 | 0.49 | 1278 | 1257 |
| A9 | 0.55 | 2.5 | -0.3 | 10.4 | 17.3 | 6.92 | 0.08 | 1.39 | 1280 | 1253 |
| A10 | 0.55 | 2.5 | -0.4 | 10.5 | 17.5 | 6.87 | 0.07 | 2.07 | 1277 | 1249 |
| A11 | 0.55 | 2.5 | -0.5 | 10.6 | 17.7 | 6.85 | 0.07 | 2.59 | 1278 | 1257 |
| A12 | 0.55 | 2.5 | -0.6 | 10.7 | 17.8 | 6.81 | 0.07 | 3.03 | 1275 | 1254 |
| A13 | 0.70 | 1.5 | -0.2 | 10.3 | 17.1 | 7.12 | 0.07 | -1.61 | 1277 | 1248 |

MFD and variance are values with 1310 nm. MACRO Bending loss is value with 1650 nm, a bending radius of r=7.5 mm, and 10 turns.

| | Δ1 | α1 | Δ2 | Δ3 | a/μm | b/μm | c/μm | MFD/μm | MACRO BEND LOSS/dB | VARIANCE / ps/ nm·km | λc /nm | λcc /nm |
|---|---|---|---|---|---|---|---|---|---|---|---|---|
| B | 0.60 | 1.7 | -0.4 | 0.2 | 10.2 | 17.0 | 18.7 | 6.95 | 0.04 | 0.92 | 1279 | 1256 |
| B1 | 0.50 | 4.0 | -0.4 | 0.2 | 10.1 | 16.8 | 18.5 | 6.95 | 0.21 | 2.74 | 1282 | 1259 |
| B2 | 0.55 | 4.0 | -0.4 | 0.2 | 9.5 | 15.9 | 17.5 | 6.61 | 0.07 | 2.39 | 1280 | 1255 |
| B3 | 0.55 | 4.5 | -0.4 | 0.2 | 9.4 | 15.6 | 17.2 | 6.56 | 0.06 | 2.46 | 1280 | 1255 |
| B4 | 0.70 | 1.0 | -0.4 | 0.2 | 12.2 | 20.3 | 22.3 | 7.19 | 0.17 | -0.74 | 1283 | 1258 |
| B5 | 0.70 | 1.5 | -0.4 | 0.2 | 10.6 | 17.7 | 19.5 | 6.68 | 0.03 | -0.09 | 1282 | 1257 |
| B6 | 0.75 | 1.5 | -0.4 | 0.2 | 10.2 | 17.0 | 18.7 | 6.44 | 0.01 | -0.52 | 1279 | 1253 |
| B7 | 0.60 | 2.0 | -0.1 | 0.2 | 9.7 | 16.1 | 17.7 | 6.99 | 0.11 | -2.26 | 1280 | 1252 |
| B8 | 0.60 | 2.0 | -0.2 | 0.2 | 10.2 | 17.0 | 18.7 | 7.00 | 0.06 | -0.52 | 1282 | 1254 |
| B9 | 0.60 | 2.0 | -0.3 | 0.2 | 10.4 | 17.4 | 19.1 | 6.97 | 0.05 | 0.47 | 1279 | 1251 |
| B10 | 0.60 | 2.0 | -0.4 | 0.2 | 10.6 | 17.7 | 19.5 | 6.95 | 0.04 | 1.20 | 1282 | 1249 |
| B11 | 0.60 | 2.0 | -0.5 | 0.2 | 10.7 | 17.9 | 19.7 | 6.93 | 0.04 | 1.76 | 1283 | 1257 |
| B12 | 0.65 | 2.5 | -0.4 | 0.1 | 9.6 | 16.0 | 17.6 | 6.59 | 0.01 | 1.22 | 1281 | 1251 |
| B13 | 0.65 | 2.5 | -0.4 | 0.2 | 9.6 | 16.0 | 17.6 | 6.60 | 0.01 | 1.17 | 1282 | 1253 |
| B14 | 0.65 | 2.5 | -0.4 | 0.3 | 9.6 | 16.0 | 17.6 | 6.61 | 0.01 | 1.13 | 1284 | 1249 |
| B15 | 0.70 | 2.0 | -0.2 | 0.2 | 9.2 | 14.2 | 15.6 | 6.83 | 0.05 | -2.05 | 1276 | 1247 |

FIG.9

SINGLE-MODE OPTICAL FIBER

CROSS-REFERENCE TO RELATED APPLICATIONS

This application claims the benefit of priority of Japanese Patent Application No. 2004-313625 filed on Oct. 28, 2004, and the disclosure of which is incorporated herein by its entirety.

BACKGROUND OF THE INVENTION

1) Field of the Invention

This invention relates to a single-mode optical fiber that has a core and a cladding.

2) Description of the Related Art

There is a demand for more inexpensive ways to provide communication services, at various speeds, as a social infrastructure supporting the recent advanced information society, which is typified by Internet services. The introduction of optical fiber for offices and homes or apartments (FTTH: Fiber To The Home) is advancing at a rapid speed. With respect to optical fiber used for FTTH, just as with metal cables, ease of handling is required. That is, it is required that surplus cables are storable compactly in closures and cabinets; and that they are not damaged in the case of a momentary bend being added, such as hooking. If such demand is taken into consideration, the conventional single-mode fiber (SMF) specified in International Telecommunication Union Telecommunication Standard Sector (ITU-T) G.652 is unsuitable, since a large macro bending loss arises.

Generally, in the case of adding a bend to an optical fiber by external stress, the transmission loss of the optical fiber becomes large. This increase of transmission loss, due to a bend, is called a macro bending loss. The smaller the bending radius is, or the longer the wavelength is, the greater the macro bending loss arises. And the increase becomes exponential. In ITU-T, the wavelength region of 1260 nm to 1625 nm is defined as the transmission wavelength region of optical fiber used for Passive Optical Network (PON) systems, and optical communications in the same wavelength region are performed with FTTH. Additionally, if a wavelength band of monitoring light is to be added to this wavelength region, it is desirable that the optical fiber transmits optical signals excellently in a wavelength up to 1650 nm at the longest. In other words, the macro bending loss of an optical fiber used for FTTH needs to be sufficiently low, even when it transmits light signals at a wavelength of 1650 nm.

As an optical fiber that addresses these points, the optical fiber having a trench type refractive index profile in which the cladding area is composed of the cladding and an area with a lower refractive index than the cladding, is known (for example, see Fujikura Ltd., Optics and Electronics Laboratory, Optical process research department, Masashige Ikeda, Shoichiro Matsuo, Kuniharu Himeno, "Reduced Splice Loss Type Low Bending Loss Optical Fiber", The institute of electronics, information and communication engineers, Technical report of the institute of electronics, information and communication engineers, OCS2003-43, OFT2003-25 (2003-8)).

And, when an optical fiber cable is to be laid for users' homes at the introduction of a FTTH system, it is expected that bends will be added to a drop cable, to an extent equivalent to adding 10 turns at a bending radius of 7.5 mm, between a point the drop cable is branched from a main line up to the connection to the ONU (Optical Network Unit).

On the other hand, for example, in a conventional SMF complying with ITU-T G.652, when adding 10 turns of bends of bending radius of 7.5 mm, a macro bending loss arises of about 40 dB at a wavelength of 1550 nm, and approximately 120 dB at a wavelength of 1650 nm. Additionally, with the optical fiber presented in the document cited above, the reduction of a macro bending loss at 1650 nm is still insufficient. Given this situation, reducing the macro bending loss of optical fiber is the basic technology critical for spread of FTTH. If the macro bending loss is 0.1 dB or less, in the case of adding 10 turns of bends of bending radius of 7.5 mm, the macro bending loss is lowenough to apply for FTTH systems.

With a conventional SMF made of silica glass, there is a need to make the effective refractive index of the fundamental mode high to reduce the macro bending loss. The high effective refractive index is realized by making relative refractive difference $\Delta$ between the core and the cladding large in a refractive index profile of the optical fiber. The relative refractive index difference $\Delta$ is defined by the following equation (1). In the equation (1), $n_{core}$ and $n_{cladding}$ are the refractive indexes of the core area and cladding area respectively.

$$\Delta = \{(n_{core} - n_{cladding})/n_{core}\} \times 100\% \tag{1}$$

Figure 1:
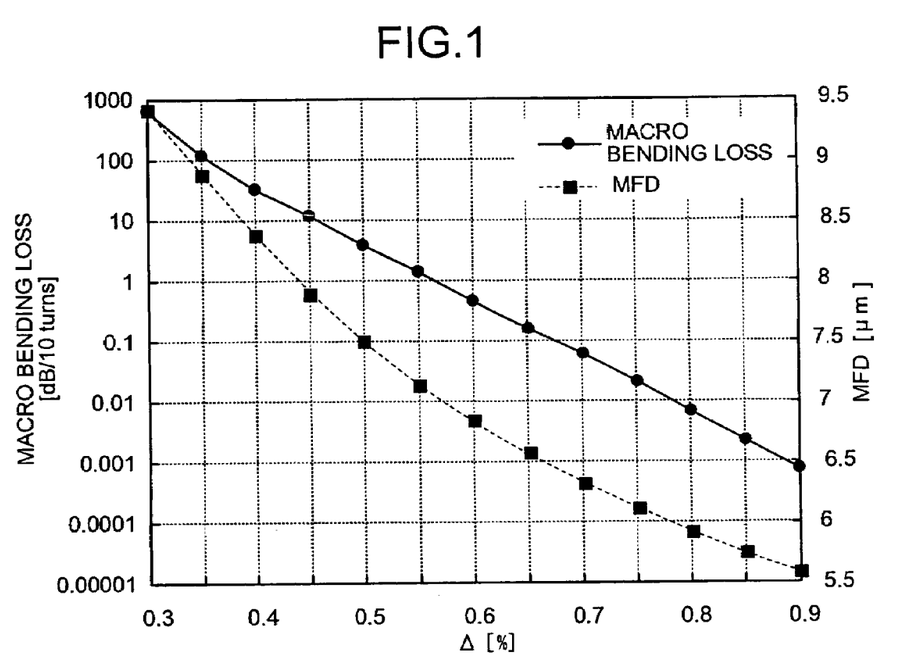
FIG. 1 is a graph showing the relation among the relative refractive index difference Δ, the macro bending loss (values at the wavelength of 1650 nm), and the MFD (values at the wavelength of 1310 nm) with an optical fiber having the step type refractive index profile.

FIG. 1 shows the results obtained by simulations of the relations among the relative refractive index difference $\Delta$, the macro bending loss of bending radius of 7.5 mm at the wavelength of 1650 nm, and the mode field diameter (MFD) at the wavelength of 1310 nm, in the case of an optical fiber having a step type refractive index profile. In this simulation, the fiber cutoff wavelength $\lambda_c$ was set to 1280 nm. In this case, the cable cutoff wavelength $\lambda_{cc}$ becomes 1260 nm or less.

On this specification, the fiber cutoff wavelength $\lambda_c$ and the cable cutoff wavelength $\lambda_{cc}$ are assumed to be the fiber cutoff wavelength $\lambda_c$ and the cable cutoff wavelength $\lambda_{cc}$, which are specified in ITU-T G.650.1. Other terms, which are not specifically defined, are assumed to follow the definition and measuring method on ITU-T G.650.1.

With regard to the relative refractive index difference $\Delta$, when the relative refractive index difference $\Delta$ is set high as 0.7% or more, the macro bending loss at the wavelength of 1650 nm becomes low sufficiently as 0.1 dB/10 turns or under, then it is usable for FTTH systems.

On the other hand, the MFD becomes 6.3 µm or under at 1310 nm, i.e., smaller by 3 µm or more than the MFD of conventional SMF. Generally, if the relative refractive index difference $\Delta$ becomes larger, the confinement of the guided mode tends to be stronger, and the MFD tends to be smaller.

And, on the introduction of FTTH, at the time of actually laying the optical fibers, there is a need to splice them with the existing laid conventional SMFs. As many fiber installers execute the splicings frequently, it is desirable that the splicing is easy and cost effective, and the splicing loss is low.

The splicing loss T, which arises on splicing optical fiber, is determined by coupling coefficient $\eta$. And the splicing loss T is logically calculated by the following equations (2)~(4):

$$T = -10 \times \log \eta \tag{2}$$

$$\eta = \kappa \times \exp\{-\kappa[(1/w_1^2 + 1/w_2^2)x_0^2/2]\} \tag{3}$$

$$\kappa = 4/\{(w_1/w_2 + w_2/w_1)^2 + (\lambda z/\pi w_1 w_2)^2\} \tag{4}$$

Figure 2:
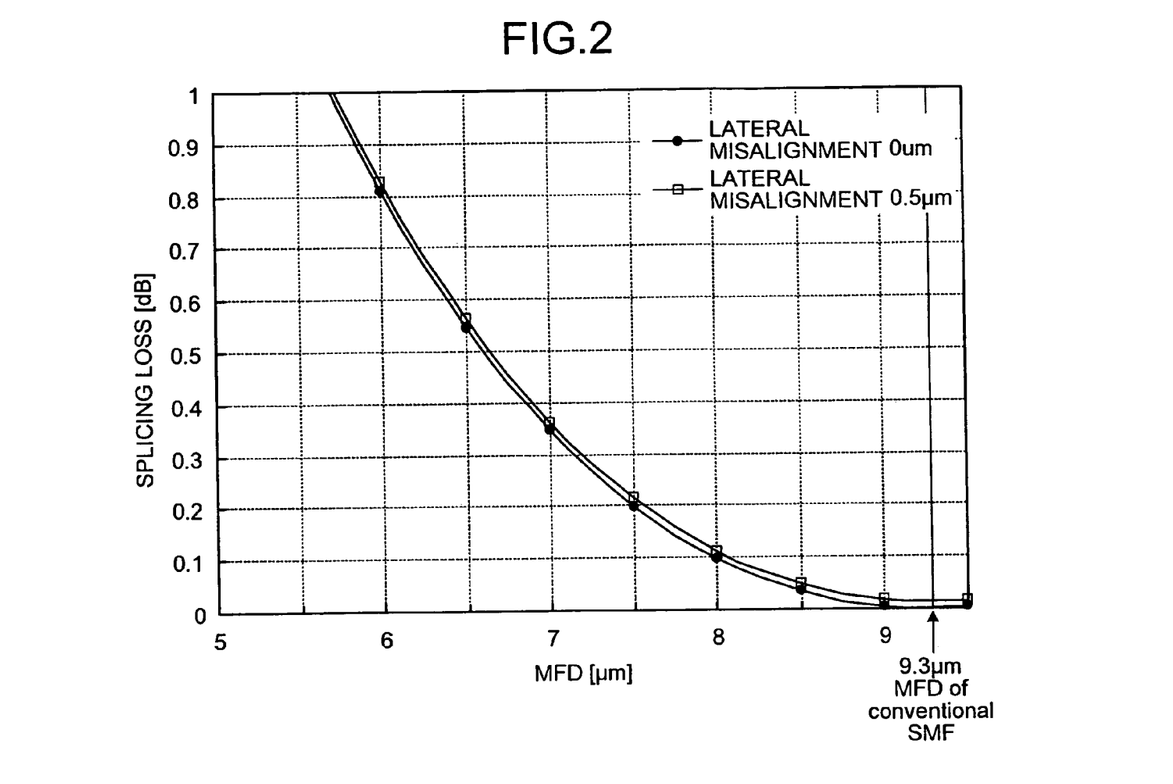
FIG. 2 is a graph showing the relation between the splicing loss by mechanical splice (values at the wavelength of 1310 nm) and the MFD (values at the wavelength of 1310 nm) with a conventional SMF.

Here, $w_1$ and $w_2$ are the mode field radiuses of the both optical fibers connected each other, $x_0$ is the lateral misalignment of the fibers, κ is related to the used wavelength, and z represents the separation distance between the optical fiber ends. Here, it is assumed that the fiber axes coincide with each other. A relation between MFD and the splicing loss obtained by the above equations is shown in FIG. 2. In these calculations, providing connecting a conventional SMF having MFD=9.3 μm and a fiber having a various MFDs. The calculation is executed by assuming the separation distance between the ends of the splicing optical fibers z as 0. As can be seen from FIG. 2, when the difference in MFDs between the spliced optical fibers is larger, a larger splicing loss arises In FIG. 2, it can be seen that such a splicing loss as large as about 0.7 dB arises in splicing of a conventional SMF having MFD of about 9.3 μm at wavelength 1310 nm and an optical fiber having a step type refractive index profile of the relative refractive index difference Δ=0.7% and MFD=6.3 μm. It is desirable for the splicing loss on building of FTTH systems to become 0.5 dB or less. And, on an actual splicing, the fiber axes do not coincide completely because of the dimension of the mechanical splice and the dimensional precision of cladding diameter of optical fiber so it is necessary to take the decrease of the coupling coefficient into consideration for estimating the splicing loss. Considering the worst case, a design of an optical fiber of which the splicing loss with the conventional SMF is sufficiently low under the condition that the lateral misalignment is 0.5 μm is needed. And, the MFD needs to be 6.6 μm or more to make the splicing loss 0.5 dB or less.

Figure 3:
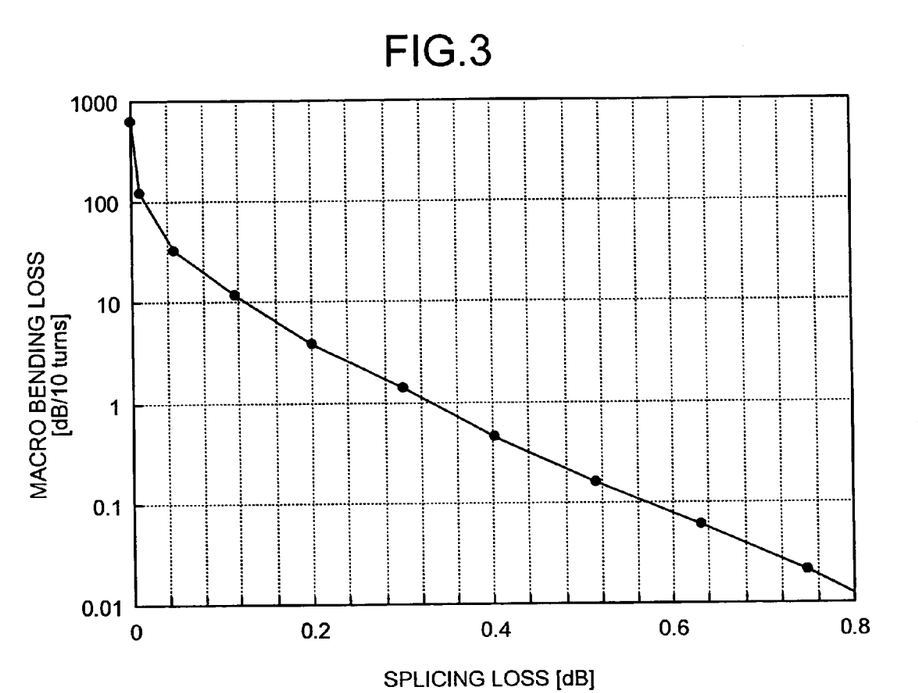
FIG. 3 is a graph showing the relation between the splicing loss by mechanical splice (values at the wavelength of 1310 nm) and the macro bending loss (values at the wavelength of 1650 nm) with a conventional SMF.

As above, in the design of the refractive index profile of optical fiber, if the relative refractive index difference Δ is made larger to reduce a macro bending loss, MFD becomes smaller, and it causes an increase in the splicing loss. A relation between the macro bending loss and the splicing loss is shown in FIG. 3 in the case of changing the relative refractive index difference Δ of an optical fiber having a step type refractive index profile. Here, the horizontal axis represents the splicing loss in the case of splicing a conventional SMF having MFD=9.3 μm at a wavelength of 1310 nm and a fiber having MFD that differs from it. And the vertical axis represents the macro bending loss arising in the case of bending a fiber having various MFD and showing the displayed splicing loss at a bending radius=7.5 mm at a wavelength of 1650 nm. As shown in FIG. 3, a trade-off relation exists between the macro bending loss and the splicing loss.

Figure 4:
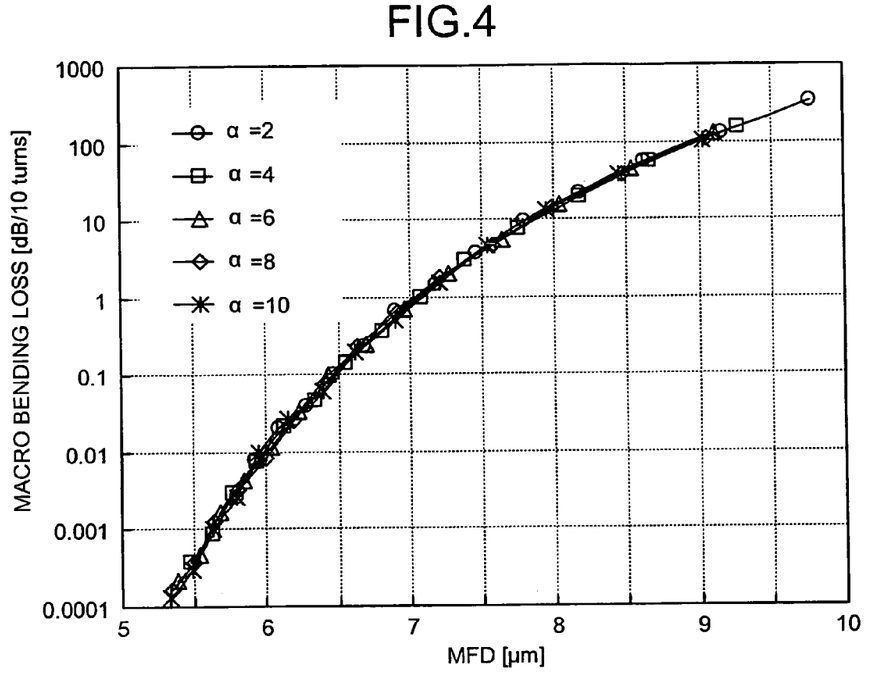
FIG. 4 is a graph showing the relation between the macro bending loss (values at the wavelength of 1650 nm) and the MFD (values at the wavelength of 1310 nm) in the case of changing the α value represents the shape of the refractive index profile and the relative refractive index difference with an optical fiber having the step type refractive index profile.

The result obtained by simulation of the relation between the MFD at the wavelength of 1310 nm and the macro bending loss at the wavelength of 1650 nm is shown in FIG. 4, while setting the fiber cutoff wavelength $\lambda_c$ as 1280 nm, and changing the α value represents the shape of refractive index profile with an optical fiber having a step type refractive index profile. The α value is defined by the following equation (5). The center shape of the first layer (core) has a more roundness (shifting triangular shape to quadrangular shape) as the α value becomes larger.

$$n^2(r) = n_{core}^2 \{1 - 2(\Delta/100) \times (2r/a)^\alpha\} \quad (5)$$

(In this regard, 0<r<a/2)

Here, r represents a position from the center of an optical fiber toward radius, and n(r) represents a refractive index at a position r. As shown in FIG. 4, with a step type refractive index profile, it is found that the relation between the macro bending loss and the MFD is not influenced by the α value, under the above condition, that the fiber cutoff wavelength $\lambda_c$ is fixed at 1280 nm and the relative refractive index difference Δ and the α value areadjusted. Then, it is found that the trade-off relation between the macro bending loss and the splicing loss cannot be improved, if the relative refractive index difference Δ and the α value are changed. This means that the step type refractive index profile cannot satisfy the aimed value of the macro bending loss of 0.1 dB/10 turns or less and the splicing loss of 0.5 dB or less.

SUMMARY OF THE INVENTION

This invention is made with the above view, and aims at realizing the reduction of both the macro bending loss and the splicing loss, and at providing a single-mode optical fiber which can perform high-speed optical transmission.

A single-mode optical fiber according to one aspect of the present invention comprises a core and a cladding; propagates an optical signal at a wavelength of 1310 nm, in single-mode operation; has a mode field diameter of not less than 6.6 μm at the wavelength of 1310 nm; and has a macro bending loss of not more than 0.1 dB/10 turns with a bending radius of 7.5 mm at a wavelength of 1650 nm.

The other objects, features, and advantages of the present invention are specifically set forth in or will become apparent from the following detailed description of the invention when read in conjunction with the accompanying drawings.

DETAILED DESCRIPTION

Below, an embodiment of a single-mode optical fiber according to the invention will be described in detail with reference to drawings. However, the invention will not be limited by the embodiment of the invention. Below, the outline of characteristics of single-mode optical fiber's constitution related to the invention will be described as the embodiment, and then, actual single-mode optical fibers that meet such characteristics will be described in detail as examples of the embodiment.

The single-mode optical fiber of the embodiment improves a trade-off relation between the macro bending loss and the splicing loss by having a refractive index profile of the core area of a W-shaped profile of two-layer structure or a W segment shaped profile of three-layer structure, additionally optimizing the structural parameters thereof.

Figure 5:
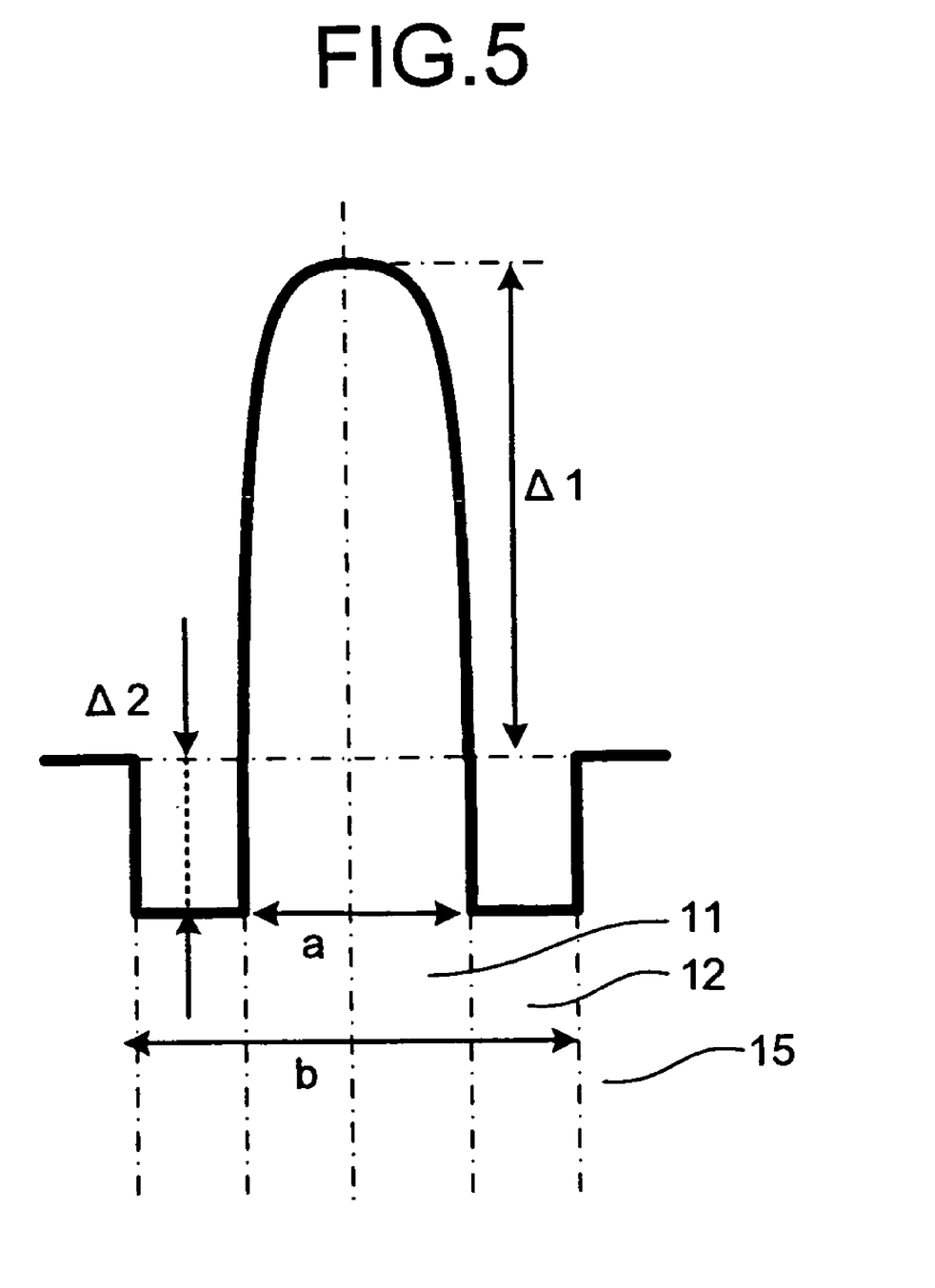
FIG. 5 is a graph showing the W-shaped profile of the first example of an embodiment.

Here, the "W-shaped profile" is a refractive index profile shown in FIG. 5, and it means the profile which is a type of having a lower refractive index of a second layer which is formed around a first layer (a second core 12, in a first example of the embodiment) than the first layer including a central axis (a first core 11, in the first example of the embodiment), and additionally having a higher refractive index of a third layer which is formed around the second layer (a cladding 15, in the first example of the embodiment) than the second layer.

Figure 7:
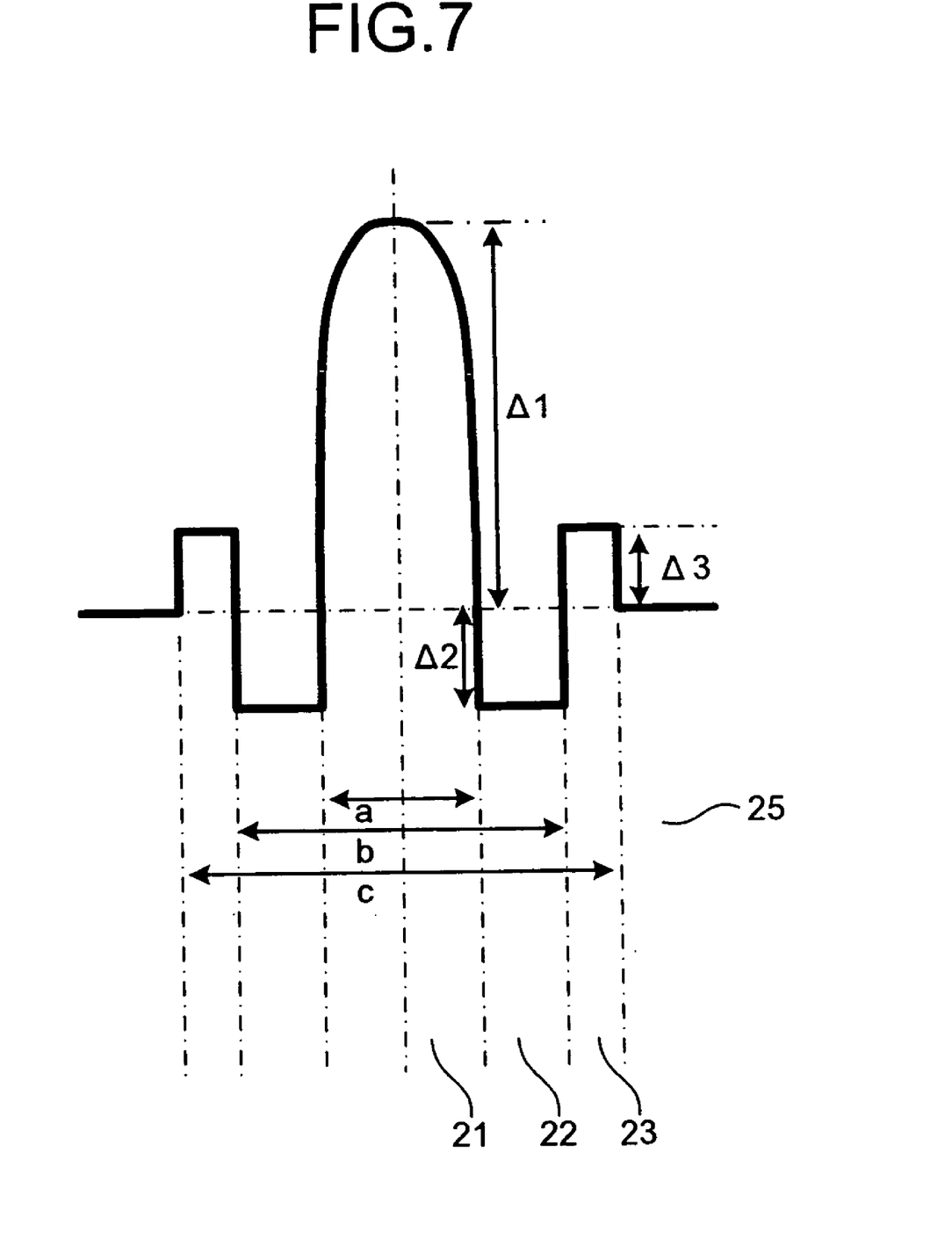
FIG. 7 is a graph showing the W segment shaped profile of the second example of the embodiment.

And, the "W segment shaped profile" is a refractive index profile shown in FIG. 7, and it means the profile which is a type of having a lower refractive index of a second layer which is formed around a first layer (a second core 22, in a second example of the embodiment) than the first layer including a central axis (a first core 21, in the second example of the embodiment), having a higher refractive index of a third layer which is formed around the second layer (a third core 23, in the second example of the embodiment) than the second layer, and additionally having a lower refractive index of a fourth layer which is formed around the third layer (a cladding 25, in the second example of the embodiment) than the third layer.

As previously described, in the case of step type refractive index profile, even if the core diameter and each characteristics were changed under the condition of keeping cutoff wavelength constant, the optical fiber having comparable MFD shows comparable the macro bending loss with almost no dependency on the core profile (α value). However, for the W-shaped profile that includes the second core, which has a lower refractive index than the cladding as the second core on outer of the first core, MFD can be large when there are a macro bending loss and a cutoff wavelength that are comparable to the step type refractive index profile. It is because of that, by comprising the second core, which has a lower refractive index than the cladding, if the relative refractive index difference Δ has been higher, the cutoff wavelength does not shift to the long wavelength side, so the adjustment of the core diameter is not necessary. And if the second core, which has a lower refractive index than the cladding, is comprised, the profile of the first core influences MFD largely. If the α value, which represents the shape of the refractive index profile of the first core, is smaller, the confinement of the guided mode becomes weaker and the MFD can be larger. On the other hand, the level of relative refractive index difference Δ or the width of the second core does not likely influence MFD.

With the W segment shaped profile, comparable characteristics to the outlined W-shaped profile can be obtained. The effectiveness of the second core having a lower refractive index than the cladding is same as the case of W-shaped profile, and the trade-off relation between the macro bending loss and the splicing loss can be improved further by comprising the third core on outer side.

The characteristics of the single-mode optical fiber made of silica glass, which has the W-shaped refractive index profile, are shown in FIG. 5 by simulations. The optical fiber includes the first core 11 (diameter a) doped germanium as the first layer including the central axis, and comprises the second core 12 (diameter b) having the lower refractive index than the cladding doped fluorine as the second layer surrounding this first core 11. And it includes the cladding 15 around the second core 12.

With the W-shaped refractive index profile, the diameter a of the first core 11 is assumed to be the diameter of the position having a same refractive index of the cladding 15 at the border of the first core 11 and the second core 12; the diameter b of the second core 12 is assumed to be the diameter of the position having a ½ of relative refractive index difference of the relative refractive index difference Δ2, which is described below, at the border of the second core 12 and the cladding 15.

The relative refractive index difference Δ1 and the relative refractive index difference Δ2 are respectively the relative refractive index difference of the first core 11 with the cladding 15 or the relative refractive index difference of the second core 12 with the cladding 15; these are expressed as the following equations (6) and (7).

$$\Delta 1 = \{(n_{c1} - n_c)/n_{c1}\} \times 100\% \qquad (6)$$

$$\Delta 2 = \{(n_{c2} - n_c)/n_{c2}\} \times 100\% \qquad (7)$$

Here, $n_{c1}$ is the maximum refractive index of the first core 11, $n_{c2}$ is the minimum refractive index of the second core 12, and $n_c$ is the refractive index of the cladding 15.

Figure 6:
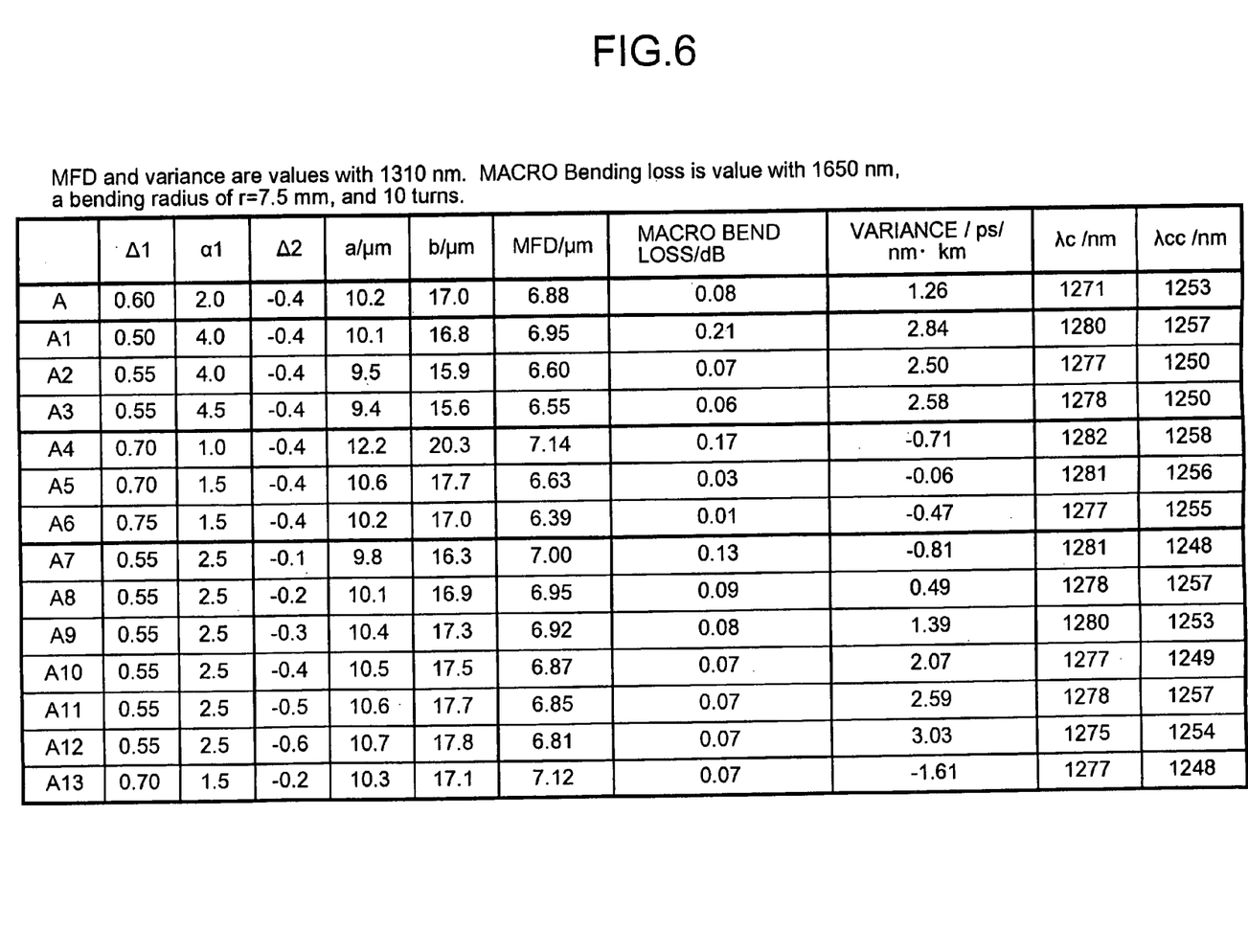
FIG. 6 is a chart showing the list of characteristics when each structural parameter are changed with the optical fiber having the W-shaped profile of the first example of the embodiment (the MFDs are values at 1310 nm; the macro bending losses are values at 1650 nm)

Simulation results of changing each structural parameters for the optical fiber having the W-shaped profile are shown in fibers A and A1~A12 of FIG. 6.

With the fiber A, the MFD became 6.88 μm at the wavelength of 1310 nm, and the macro bending loss was 0.08 dB/10 turns with the bending radius of 7.5 mm at 1650 nm, and the single-mode operation was carried out at the wavelength of 1310 nm.

The change of characteristics in the case of changing the α value represents the shape of the refractive index profile of the first core 11 and the relative refractive index difference Δ1 of the first core 11 are shown in A1~A6. In A1~A6, it is A2 and A5 that the MFD becomes 6.6 μm or more at the wavelength of 1310 nm, and optical signals are transmit with single-mode operation at the wavelength of 1310 nm, and addition of these, when it is bended by the bending radius of 7.5 mm, the macro bending loss is 0.1 dB/10 turns or less at the wavelength of 1650 nm. Thus, from those simulation results, with the optical fiber having the W-shaped profile like shown in FIG. 5, it is needed to make the relative refractive index difference of the first core 11 Δ1 to 0.55% or more and 0.70% or less, and the α value, which represents the shape of the refractive index profile to 1.5 or more and 4.0 or less.

The change of characteristics in the case of changing the relative refractive index difference Δ2 of the second core 12 is shown in A7~A12. It is found that favorable characteristics can be obtained by keeping the relative refractive index difference Δ2 −0.2% or less. And, in the case of keeping the relative refractive index difference Δ2 −0.4% or less, more remarkable improvement cannot be confirmed. As above, in the W-shaped profile, it is found that we can obtain the optical fiber having expected characteristics by optimizing structural parameters.

Figure 8:
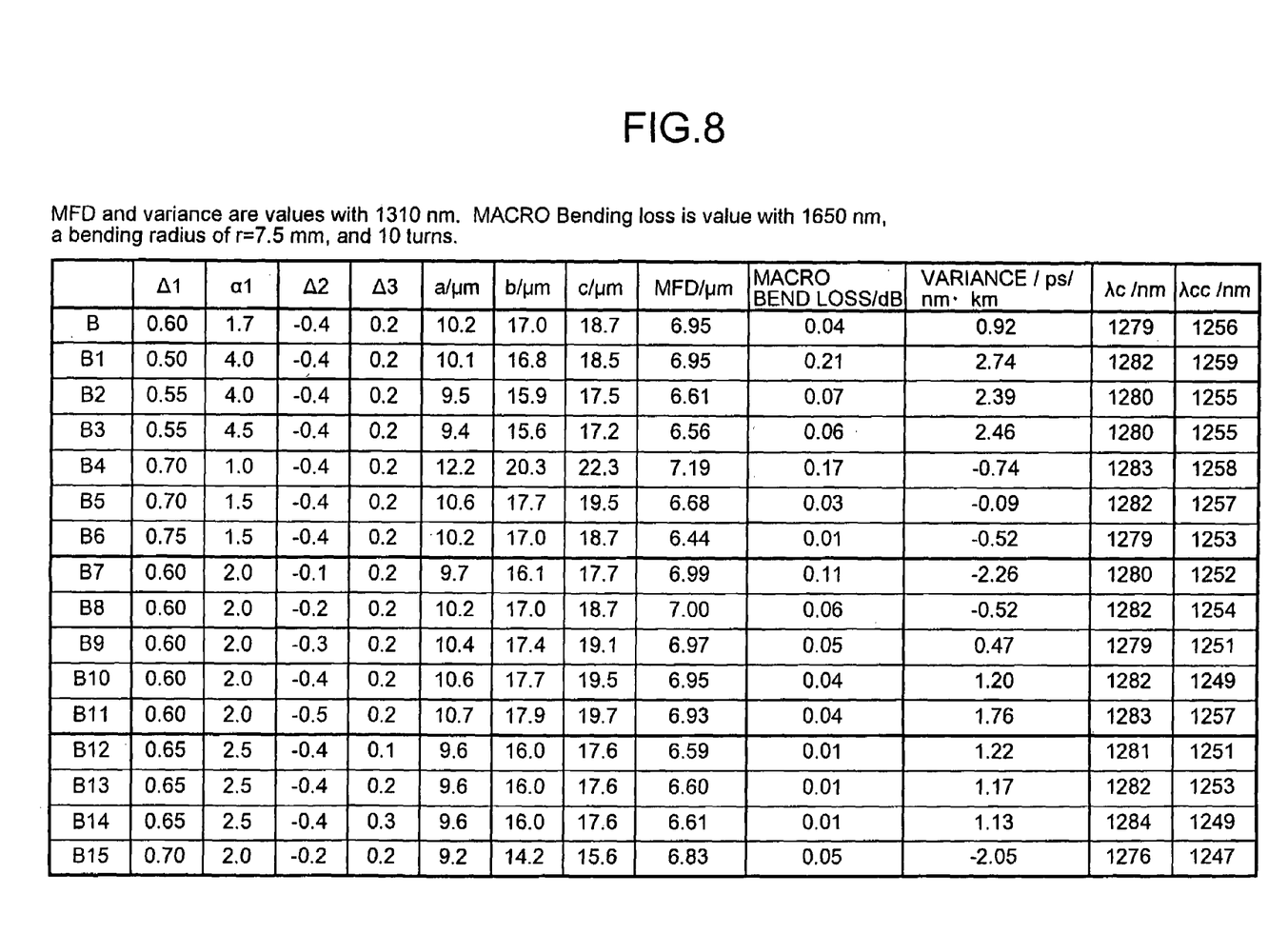
FIG. 8 is a chart showing the list of characteristics when each structural parameter are changed with the optical fiber having the W segment shaped profile of the second example of the embodiment (the MFDs are values at 1310 nm; the macro bending losses are values at 1650 nm)

The characteristics obtained by the simulation of the single-mode optical fiber made of silica glass, which has the W segment shaped profile shown in FIG. 7, are shown in B, B1~B14 of FIG. 8. The optical fiber of the second example includes the first core 21 (diameter a) doped germanium on the first layer, the second core 22 (diameter b) having lower refractive index than the cladding doped fluorine on the second layer, and the third core 23 (diameter c) having higher refractive index than the cladding doped germanium on the third layer. And the cladding 25 is provided surrounding the third core.

And, with the W segment shaped profile, the diameter a of the first core 21 is assumed to be the diameter of the position having a same refractive index of the cladding 15 at the border of the first core 21 and the second core 22. The diameter b of the second core 22 is assumed to be the diameter of the position having a ½ of relative refractive index difference of the relative refractive index difference Δ2 at the border of the second core 22 and the third core 23. The diameter c of the third core 23 is assumed to be the diameter of the position having a 1/10 of relative refractive index difference of the relative refractive index difference Δ3, which is described below, at the border of the third core 23 and the cladding 25.

The relative refractive index difference Δ3 is the relative refractive index difference of the third core 23 with the cladding 25, and shown as the following equation (8):

$$\Delta 3 = \{(n_{c3} - n_c)/n_{c3}\} \times 100\% \quad (8)$$

Here, $n_{c3}$ is the maximum refractive index of the third core 23 in the W segment shaped profile. Additionally, the simulation result of changing each structural parameters is shown in fiber B, B1~B14 of table 1. In B and B1~B8 of FIG. 8, it is B, B2, B5, B8~B11, and B13~B14 that the MFD becomes 6.6 µm or more at the wavelength of 1310 nm, and optical signals are transmitted with single-mode operation at the wavelength of 1310 nm, and additionally, when it is bended by the bending radius of 7.5 mm, the macro bending loss is 0.1 dB/10 turns and less at the wavelength of 1650 nm.

From those simulation results, similar to the case of the W-shaped profile, it is found that, it is needed to make the relative refractive index difference of the first core 21 Δ1 0.55% or more and 0.70 or less, and the α value which represents the shape of the refractive index profile 1.5 or more and 4.0 or less, and the relative refractive index difference Δ2 −0.2% or less, and additionally, the characteristics can be improved by making the relative refractive index difference Δ3 0.2% or less by the characteristics list of B12~B14.

From those simulation results, with the optical fiber having the W segment shaped profile shown in FIG. 7, it is found that the optical fiber having expected characteristics can be obtained by making the relative refractive index difference Δ1 of the first core 21 0.55% or more and 0.70 or less, the α value of the refractive index profile 1.5 or more and 4.0 or less, the relative refractive index difference Δ2 of the second core 22, and the relative refractive index difference Δ3 of the third core 23 0.2% or less.

Figure 9:
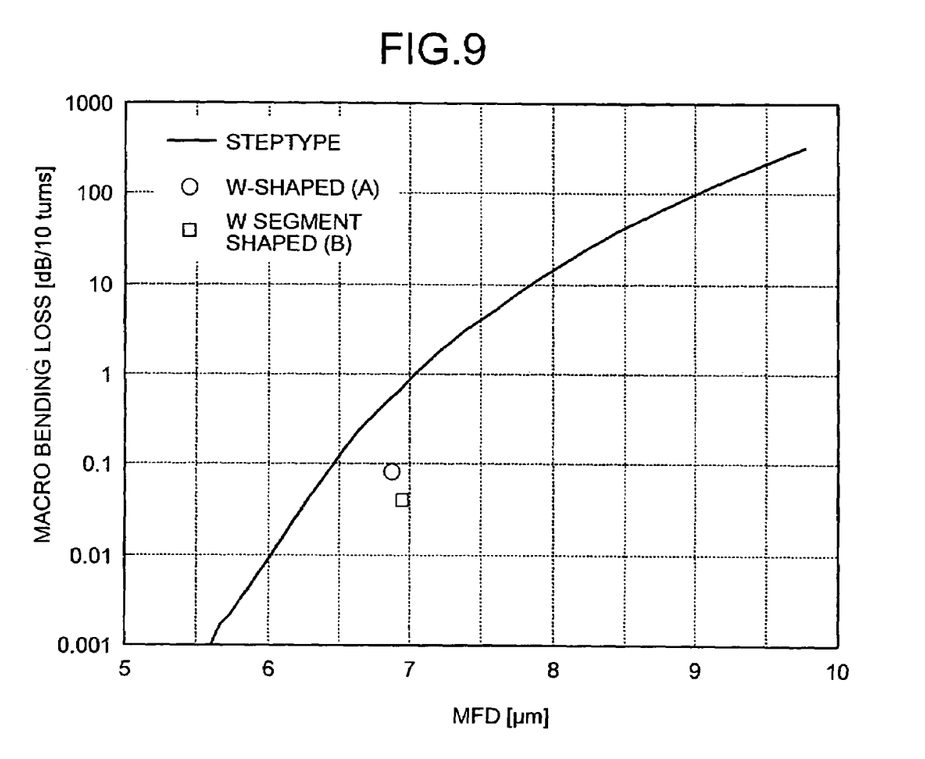
FIG. 9 is a graph showing the relation between the macro bending loss and the splicing loss with the W-shaped profile and the W segment shaped index profile.

The MFD at 1310 nm and the macro bending loss at 1650 nm, which are obtained with the optical fiber having the W-shaped profile (the refractive index profile of FIG. 5) and the optical fiber having the W segment shaped profile (the refractive index profile of FIG. 7), are shown in FIG. 9. FIG. 9 shows a curve, which represents the relation between MFD and the macro bending loss with the step type refractive index profile, for comparison. It can be seen that the optical fiber of both refractive index profile are improved the trade-off relation between MFD and the macro bending loss comparing with the step type refractive index profile.

As above, it was confirmed that the single-mode optical fiber, which are suitable for the building of FTTH systems and excellent of both characteristics of the macro bending loss and the splicing loss when it transmitting optical signals of the wavelength up to 1650 nm, can be made.

According to the embodiment, reduction of both losses of the macro bending loss and the splicing loss are realized, and high-speed optical transmission can be performed.

The optical fiber according to the invention is optimal for optical fiber needed as building FTTH systems, and is specifically optimal for drop cables, indoor optical fiber cords, optical fiber for premises wiring.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A single-mode optical fiber comprising a core and a cladding; propagating an optical signal at a wavelength of 1310 nm, in single-mode operation; having a mode field diameter of not less than 6.6 µm at the wavelength of 1310 nm; and having a macro bending loss of not more than 0.1 dB/10 turns with a bending radius of 7.5 mm at a wavelength of 1650 nm.

2. The single-mode optical fiber according to claim 1, wherein the core comprising a first core at the center of the single-mode optical fiber and a second core surrounding the first core, and when the relative refractive index difference of the first core with the cladding is assumed to be Δ1, and a relative refractive index difference of the second core with the cladding is assumed to be Δ2, then Δ1>0>Δ2.

3. The single-mode optical fiber according to claim 2, wherein the relative refractive index difference Δ1 of the first core with the cladding is not less than 0.55% and not more than 0.70%; a value α, which represents the shape of the refractive index profile of the first core, is not less than 1.5 and not more than 4.0; and the relative refractive index difference Δ2 of the second core with the cladding is not more than −0.2%.

4. The single-mode optical fiber according to claim 3, wherein the core and the cladding are made of silica glass.

5. The single-mode optical fiber according to claim 1, wherein the core comprising a first core formed by inclusion of a central axis, a second core surrounding the first core and a third core surrounding the second core and when the relative refractive index difference of the first core with the cladding is assumed to be Δ1, and the relative refractive index difference of the second core with the cladding is assumed to be Δ2, and a relative refractive index difference of the third core with the cladding is assumed to be Δ3, then Δ1>Δ3>0>Δ2.

6. The single-mode optical fiber according to claim 5, wherein the relative refractive index difference Δ1 of the first core with the cladding is not less than 0.55% and not more than 0.70%; a value α, which represents the shape of the refractive index profile of the first core, is not less than 1.5 and not more than 4.0; the relative refractive index difference Δ2 of the second core with the cladding is not more than −0.2%; and the relative refractive index difference Δ3 of the third core with the cladding is not more than 0.2%.

7. The single-mode optical fiber according to claim 6, wherein the core and the cladding are made of silica glass.

* * * * *